INVENTOR.
ROBERT J. THOMAS
BY
Roland A. Anderson
ATTORNEY

United States Patent Office 3,471,783
Patented Oct. 7, 1969

3,471,783
REFLECTIVE ATTENUATION AND DISPLAY OF PULSE SIGNAL BY MEANS OF AN ABRUPT IMPEDANCE TRANSITION IN A TRANSMISSION LINE
Robert J. Thomas, Oakland, Calif., assignor to the United States of America as represented by the United States Atomic Energy Commission
Filed Mar. 1, 1967, Ser. No. 620,212
Int. Cl. H01p 1/22
U.S. Cl. 324—114         14 Claims

ABSTRACT OF THE DISCLOSURE

Attenuation of a pulse signal is obtained in a procedure in which a relatively high characteristic impedance transmission line structure is coupled into a transmission line-segment of a lower characteristic impedance. A voltage pulse introduced into the high impedance line travels therealong and is partially reflected at the abrupt impedance transition between the respective lines. Accordingly, an attenuated portion of the voltage pulse is transmitted to a lower impedance line, which may be of a single or branched configuration to which signal display means portrays individual or selected different attenuated segments of said pulse.

---

The invention described herein was made in the course of, or under, Contract No. W-7405-Eng-48, with the United States Atomic Enegry Commission.

This invention relates in general to a method and apparatus for attenuating an electrical signal containing high frequency components. More particularly, the invention relates to the use of an abrupt impedance transition between two or more transmission line systems to attenuate a voltage pulse utilizing the phenomenon of traveling wave reflection to provide for voltage division of the signal pulse.

Voltage pulse attenuators have traditionally been based on a voltage divider principle in which voltage division is achieved through cascaded lumped-constant circuit elements. Common attenuators embodying this principle are resistive dividers, capacitive dividers, and compensated resistor-capacitor dividers. However, there are basic limitations in the fidelity of response of these prior art devices, as appear in the following considerations. First, it is impossible to build pure lumped-constant circuit elements because all practically realizable elements have a finite length and contain finite amount of each of the basic impedance parameters (i.e. resistance, capacitance and inductance). Dividers based upon pure lumped-constant elements are unsuitable when the rise time of an applied pulse approaches the transit time of a wave through the system's finite length. As the rise time of the applied pulse decreases to a value smaller than the transit time of the wave through the attenuator system, there is a change in the character of the divider response from one based primarily on lumped-constant circuitry to one based on distributed-constant circuitry. Consequently, distortions set in as this transition is approached and exceeded. It should also be noted that the individual parameters in the idealized lumped-constant element and the value of the constant itself are often nonlinear due to voltage, temperature and frequency effects, causing additional distortion in the response. Furthermore, in high voltage attenuation, practical circuit elements must be cascaded to considerable length to withstand the large electrical fields, necessitating an increase in the system's transit time and correspondingly causing a decrease in the upper limit of frequency response.

Accordingly, there is a need for a high voltage, fast rise signal attenuator. For example, in the field of nuclear detonation and explosive shock wave diagnostics, detectors generate potentials in the kilovolt range which must be reduced in magnitude before conventional detection and measurement techniques may be employed.

Therefore, it is a general object of the present invention to provide a method and means for voltage pulse attenuation capable of high equivalent frequency response (i.e., high fidelity response to pulses containing high frequency components).

It is a further object of the instant invention to provide a method and means for voltage pulse attenuation which are independent of voltage levels and temperatures.

More specifically, it is an object of the instant invention to provide a reflection-type attenuator particularly adapted for attenuating high voltages with a high equivalent frequency response not obtainable in prior art voltage divider attenuators.

I have now discovered a totally new way of attenuating electrical pulses. In general, I utilize an abrupt impedance discontinuity or transition arranged to cause reflection of a proportion of a traveling wave traversing a transmission line so that there is transmitted along the line an attenuated portion of a voltage pulse signal. Generally, the impedance discontinuity may be formed by any means providing an abrupt transition between the impedance of an input transmission line to either a higher or lower characteristic impedance output transmission line. Application of a voltage pulse signal to the input line generates a traveling wave which propagates toward the impedance transition junction. As the signal, in the form of a traveling wave, encounters the abrupt impedance transition boundary between the input and output lines, a portion of the incident wave energy is reflected back along the input line and a complementary portion of energy is transmitted to the output line. The portion of wave energy transferred beyond the boundary is reduced in voltage from the incident wave by an amount proportionate to the impedance relationship, i.e., mismatch between the lines, thereby providing a faithful attenuated reproduction of the input signal on the output line. It is noted that this reflective attenuation of the incident signal is provided by a distributed constant system, rather than the heretofore cascaded lumped-constant element system. Accordingly, the limitations in frequency response due to signal transit time, voltage nonlinearities and temperature effects do not obtain in this proportional reflective attenuation system.

The above-mentioned objects and features, as well as others, of the present invention will become apparent upon consideration of the following description of specific embodiments taken together with the accompanying drawings, of which:

FIGURE 3 is a diagrammatic view of the device of FIGURE 2, incorporated in a measurement system for providing sensitive detection and high recording resolution of a high voltage pulse;

Figure 1:
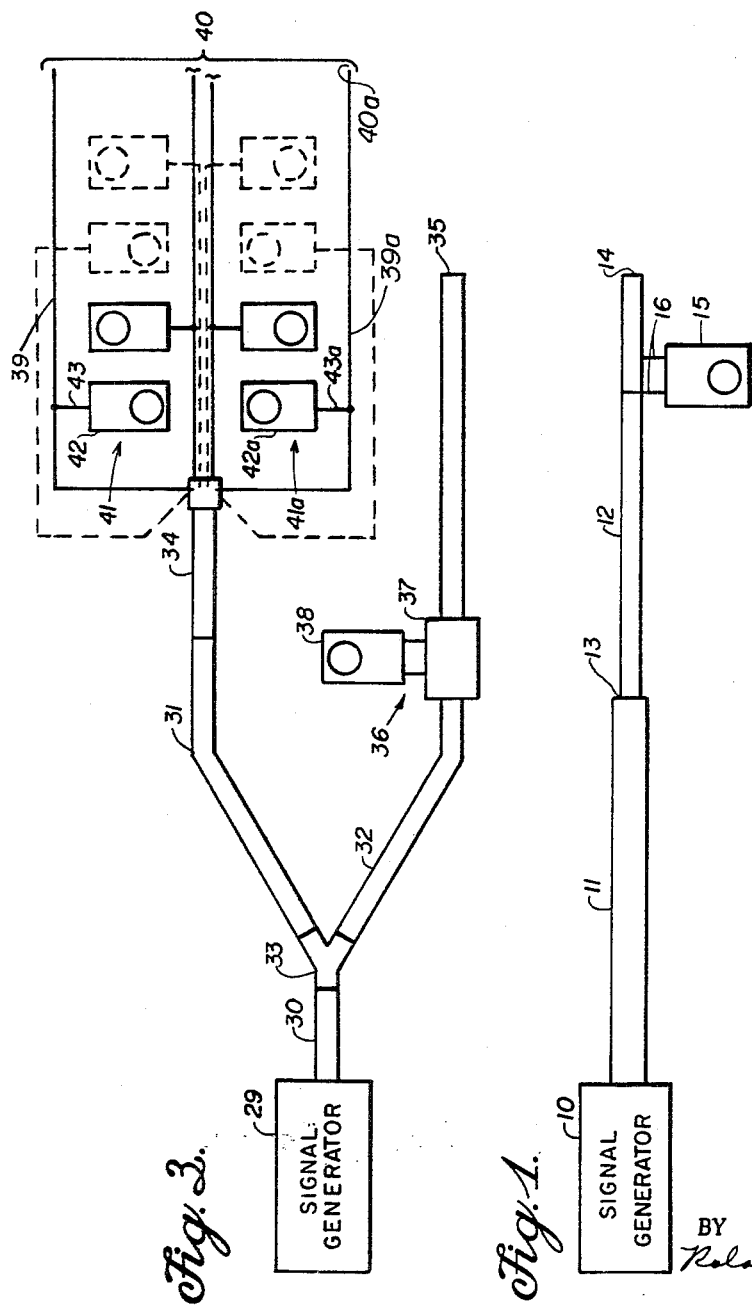
FIGURE 1 is a diagrammatic view of a generalized arrangement for attenuating, by means of a proportionating impedance transition, and for measuring an attenuated voltage pulse.

Referring now particularly to FIGURE 1, in a basic arrangement for providing such attenuation and measurement, a fast rising high voltage signal pulse generator 10 is connected to the input end of a transmission line 11 of characteristic impedance $Z_0$. Transmission line 12 of characteristic impedance $Z_1$, where $Z_1$ is less than $Z_0$, is coupled to the output end of line 11 at junction 13 to provide an abrupt transition in impedance therebetween, and line 12 is extended to terminate in an open end 14. Oscilloscope 15 is connected across line 12 through a non-reflective coupling arrangement of a type well known in the art, by means of leads 16, herein referred to as "tap-off" means.

In operation, a pulse applied across line 11 by generator 10 assumes the form of a traveling wave propagating along line 11 toward junction 13. The wave, upon encounter with the impedance transition of junction 13, is reflected partially back along line 11 and is partially transmitted therethrough to line 12.

The voltage of the transmitted portion of the wave signal is attenuated by an amount dependent on the magnitudes of impedance $Z_0$ and $Z_1$, as discussed hereinafter. This transmitted signal of attenuated voltage in wave form propagates along line 12, and is detected without reflective disturbance by oscilloscope 15 and sequentially reflected upon reaching the open end 14. To avoid distortion by reflections from intermediate discontinuities at the location of signal detection, the "tap-off" means coupling oscilloscope 15 to line 12 by leads 16 preferably should provide a non-reflective coupling. This is accomplished by using leads 16 of negligible transit time, i.e., short leads, and an oscilloscope 15 or other signal detecting means of high input impedance, i.e., approaching infinity, as nearly as design of the detection means allows.

To insure appropriate detection of the attenuated signal, i.e., view of the total signal pulse or a desired portion thereof, without interference from reflected portions of the wave, the time duration of the applied pulse or a selected portion thereof must be less than the twofold transit time characteristic of line 11 between the boundary junction 13 and the generator 10, or the twofold transit time of line 12 between the connective location of the detection leads 16 and open end 14, whichever is smaller. This selected operating parameter, which is determined by the design propagation parameters of the transmission line components, prevents the return of reflected waves from any extraneous discontinuities existing in the system to the attenuating transition junction 13 or to the line position of detection prior to the completion of attenuation or detection. An output line extended to a sufficient length to satisfy this criterion will herein be denoted as a "get lost" line.

The following mathematical relations indicate the attenuation obtained, as well as information required for design and analysis of the present attenuators:

$$\text{Output voltage} = \frac{\text{Input Voltage}}{\text{Attenuation Factor}} \quad (1)$$

$$\text{Attenuation factor} = \frac{1}{\lambda} = \frac{Z_1 + Z_0}{2Z_1} \quad (2)$$

$$\text{Transmission factor} = \lambda = \frac{2Z_1}{Z_1 + Z_0} \quad (3)$$

$$\text{Signal propagation velocity } v_t = \frac{1}{LC} \quad (4)$$

$$\text{Signal transit time } \tau = v_t \, 1 \quad (5)$$

In these expressions, $Z_1$ and $Z_0$ refer to the impedances of the input and output lines respectively, L and C to the distributed inductance and capacitance per unit length of the transmission line, and 1 refers to the length of the line.

In selecting an attenuation factor from a given input voltage and desired output voltage, Formulae 3 and 4 are applicable. Notice that Formula 4 permits a range of complementary input and output impedances for a single attenuation factor, allowing a considerable degree of freedom in the design of an attenuator where practical considerations may impose other limitations on the design characteristics of the transmission line use.

The basic arrangement shown in FIGURE 1 can be realized in a variety of ways, and utilizing a variety of transmission line components. Thus, the invention is not restricted to any one type of transmission line. For example, the voltage dividing impedance transition discontinuity may be formed in transmission lines of various types, including open wire lines, strip lines, coaxial lines, wave guides, or any appropriate combination thereof. Moreover, since the output line 12 of FIGURE 1 is extended to a sufficient length to provide elapsed time dissipation of reflected wave components, herein referred to as a "get lost" line, to avoid secondary wave reflection interference during pulse measurement or attenuation, it is immaterial how end 14 is terminated, i.e., either open end or in matched impedance fashion, since the reflected component cannot return at a time early enough to interfere with the proportionate attenuated portion.

However, if output line 12 is terminated in a resistive match, i.e., with load resistance equaling the characteristic line impedance, the traveling wave on the line, upon reaching the termination, is completely absorbed and no reflection occurs. Therefore, the output line utilizing a matched dissipation terminating impedance need only extend a short distance before termination, while reflection-free detection "tap-off" means and accompanying measurement or detection means, e.g., oscilloscope 15 and leads 16, may be disposed anywhere between the mismatch boundary 13 and the resistive termination.

The last mentioned type of output line termination might seem to appear to defeat the purpose of the invention in view of the remarks concerning frequency response supra. However, for low voltages, resistive termination can be realized with a frequency response approaching that of the transmission line transition boundary. Therefore, even though the voltage in the input line 11, before attenuation as taught by the invention, may be too large to permit use of conventional resistive voltage dividers, the attenuated voltage in the output line 12 may be at a sufficiently low level to permit such an arrangement without sacrificing frequency response.

Further, the single output transmission line 12 of the system shown in FIGURE 1 may be replaced by a plurality of output lines (not shown), each coupled in an appropriate manner to input line 11 at junction 13. In general, such a plurality of output lines will be oriented radially to provide a "fan out" single-input, multiple-output attenuator, in which an attenuated pulse propagates away from the transition junction 13 on each of the multiple output lines.

The means used to detect a signal on output line 12 may, if desired, comprise an oscilloscope adapted with a traveling-wave-deflection structure, well known in the art, wherein the deflection structure is impedance matched to and inserted in line 12 at a selected position therealong. A terminal end of this traveling-wave-structure may be coupled to an impedance matched resistor or provided with a "get lost" transmission line structure. Of course, two or more attenuating impedance mismatch junctions, separated by transmission line links having a twofold transit time at least equal to the time width of a pulse under measurement, may be connected in series to provide attenuation in an amount equaling the multiplication product of the individual attenuation factors for each junction.

One consideration in the proper usage of the present attenuator is the effect which the input line impedance $Z_0$ has upon loading of the signal generator 10. If generator 10 is part of another circuit, external to the attenuator system, and such a circuit has a characteristically high impedance in relation to $Z_0$, then the attenuator may significantly load the external circuit and distort the generator output. Alternatively, if generator 10 is driving only the attenuator, i.e., is connected only across input line 11, then generator 10 is preferably a low impedance driver (i.e., is selected with an internal dissipative impedance substantially less than the input line impedance $Z_0$. This latter consideration may be readily understood from a review of the frequency response limitations inherent in lumped constant elements. For example, if the internal dissipative impedance of the generator 10 is represented as resistive and of a value approaching the impedance $Z_0$ of input line 11, then a voltage pulse emanating from generator 10 will be limited in frequency response by the same detrimental lumped constant effects found in prior art attenuators and therefore defeat a controlling purpose of the invention. However, if the internal impedance of the source is largely non-dissipative such as found in active element current generators, then the source impedance may be equal to or larger than the input line impedance $Z_0$.

Figure 2:
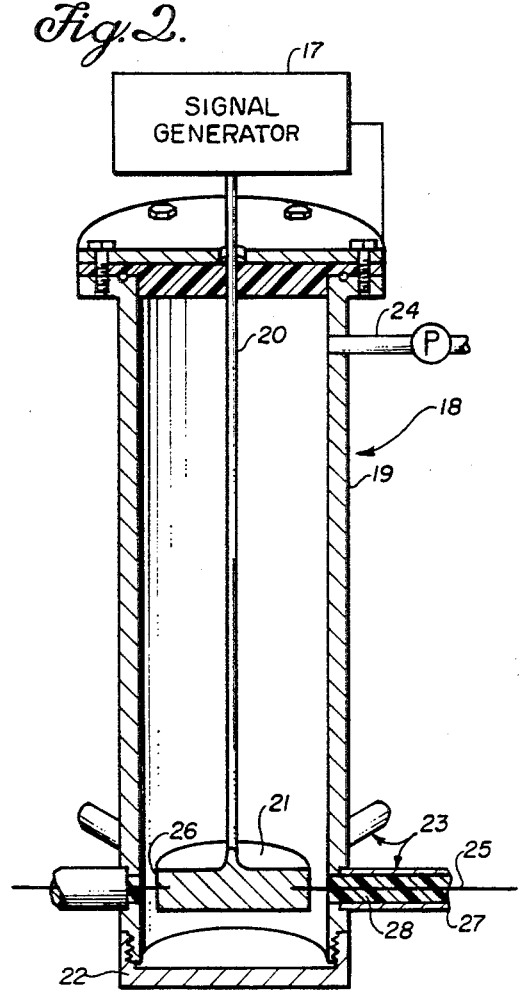
FIGURE 2 is a sectional, longitudinal view of a shielded coaxial attenuator wherein the impedance transition mismatch is provided by a single relatively high impedance line, coupled into a plurality of coaxial output lines of parallel composite low impedance, herein referred to as a coaxial "fan-out" attenuator.

The device illustrated in FIGURE 2 is a preferred embodiment for applications involving the attenuation of high voltage pulses due to its low radiative losses, large attenuation factor capabilities and high voltage breakdown withstanding characteristics.

Referring now to FIGURE 2, a signal generator 17, e.g., a conventional radiation detector with a voltage output proportional to radiation intensity, is shown disposed at one end of an enclosed pressure-sealed coaxial transmission input line 18. More specifically, one lead of generator 17 is connected to the outer conductor tubular shield 19 of line 18, with the other lead of generator 17 insulatingly piercing a first end of shield 19 to be attached to a first end of an inner axial conductor 20 of input line 18. For example, generator 17 may be a charge displacement radiation detector comprising a dielectric Lucite slab adapted with output electrodes disposed on mutually parallel sides. A quantum of radiation directed to impinge upon the Lucite slab causes a polarization of the dielectric material between the electrodes, and a resulting potential accordingly appears thereacross. This potential is proportional to the flux of the radiation incident on the Lucite slab. The voltage output of such a detector exhibits nanosecond rise times, together with tens of kilovolt potentials for radiation wave fronts such as are characteristic of nuclear detonations.

Inner conductor 20, at the second end thereof, symmetrically enlarges into a discoidal conductor, hereinafter referred to as "header" 21, proximate the second end of shield 19. Outer conductor shield 19 extends over "header" 21 in close spaced relation therewith, thus defining a short coaxial line segment having a local impedance abruptly defined and substantially less than the characteristic impedance of input line 18. "Dead end" closure 22 caps off shield 19 at a location distal header 21. Gas pressure line 24 penetrates shield 19 opening into an enclosed portion of input line 18. A plurality of coaxial transmission output lines 23 are radially spaced and perpendicular to shield 19, in the plane of "header" 21 in a radially diverging or "fan out" disposition. The inner conductor 25 of each of output lines 23 insulatingly pierces shield 19 and is securely electrically attached to a face of said header 21. An outer conductor 27 of each of output lines 23 is securely fastened to shield 19 in conductive relation thereto. The dielectrics 28 of output lines 23 provide, in conjunction with inner and outer conductors 25 and 27, a pressure seal at the intersection of output lines 23 with shield 19.

In operation of the attenuator shown in FIGURE 2, a voltage pulse from generator 17 initiates a traveling wave signal in input line 18 which propagates to the abrupt impedance mismatch boundary formed between inner conductor 20 and header 21. Here the wave is partially reflected and partially transmitted outwardly on output lines 23, wherefrom the output signal may be retrieved or viewed by hereinbefore described apparatus. As discussed supra, the transmitted portion of the signal is attenuated in proportion to the attenuation factor which is determined by the impedance of the input line and the output line or output lines, because of relation in formulae mentioned above. In this case, the output impedance is a divisional product provided by the effective parallel arrangement of the impedance of output lines 23.

It has been found that the structure referred to as a "header" is best suited to provide the desired abrupt impedance boundary, together with means for smoothly distributing the transmitted wave energy to the output lines 23. The following design criteria have been determined experimentally for shaping "header" 21 for optimizing the high equivalent frequency response.

The radial dimensions of "header" 21 are selected to provide a local impedance between "header" 21 and shield 19 approaching that of the composite parallel impedance of output lines 23. In particular, this local impedance is related to the radius of "header" 21 and the interior radius of shield 19 by the formula:

$$Z = \frac{\sqrt{\mu/\epsilon}}{2\pi} \ln\left(\frac{R_{header}}{R_{sheild}}\right) \quad (6)$$

where $\mu$ is the permeability and $\epsilon$ the dielectric constant of the pressurized enclosure. Therefore with $R_{shield}$, $\mu$ and $\epsilon$ considered constant, $R_{header}$ may be varied to provide the proper local impedance Z.

Within the criteria considered above, the thickness of "header" 21, i.e., the dimension parallel to the axis of input line 18, is made as small as possible to avoid the presence of intermediate impedance discontinuities within the system having a transit time approaching the desired time of the attenuator boundary. Finally, in shaping "header" 21, the annular edges appearing on face 26 may be rounded and the joint between inner conductor 20 and "header" 21 filleted to mitigate the intensity of reflective noise caused by wave reflections at sharp surface discontinuities.

Gas pressure line 24 permits pressurizing the enclosed portion of input line 18, thereby providing for higher breakdown voltages between "header" 21 of inner conductor 20 and outer conductor shield 19. It should be noted that the pressurized portion of the attenuator may be extended into the output lines 23 by using air dielectric cables as a substitute for the presently used solid dielectric output lines 23.

The "dead end" housing 22 is incorporated to provide a pressure seal for shield 19. Furthermore, housing 22 is preferably disposed apart from "header" 21 by a distance equalling the diameter of "header" 21 so as to minimize detrimental capacitive effects. For example, an attenuator of this type was constructed which operates at 100 kilovolts input voltage with an attenuation factor approaching 25 to provide an output voltage pulse of about 4 kilovolts. The 10% to 90% rise time, i.e., equivalent frequency response, was measured at 100 picoseconds, which is slightly greater than the anticipated practical limit for reflective attenuators, but significantly shorter than that obtainable under the subject conditions with prior art devices. A 100-ohm semiflexible air dielectric coaxial cable was used for the input line, while the output lines comprised 24½-inch semiflexible, metal-sheated foam dielectric 50-ohm coaxial transmission cables disposed in two rows around "header" 21 and shield 19. The input line dimensions were 3.00 inches for the inner diameter of the outer conductor shield, and 1.303 inches for the diameter of the inner conductor. The discoidal header was 2.900 inches in diameter, 1.470 inches thick, with a filleted junction between the inner conductor and the header of .375 inch in radius, and rounder edges of .375 inch and .125 inch in radius for the edges of the header adjacent and distal the inner conductor, respectively.

FIGURE 3 shows an embodiment which provides a plurality of output means for detailed analysis of the voltage time function characteristics at different time bases. The signal generator 29 is connected to a coaxial transmission line 30 which is attached to coaxial transmission lines 31 and 32 through coaxial T 33. Line 31 is connected to reflection attenuator 34 of the type shown in FIGURE 2, while line 32 is extended to end 35 as a reflection eliminating line, with pulse detection means 36 comprising impedance matched slow wave structure means 37, i.e., a conventional traveling wave coupling means having oscilloscope 38 connected thereon. Coaxial output transmission lines 39 "fanning" out of attenuator 34 in the manner set forth above are extended as "get lost" lines to ends 40, wherein each of lines 39 is provided with detection and measurement means 41, comprising oscilloscope 42 and reflective-free "tap off" means 43.

Transmission lines 30, 32 and 31 are each selected to have a characteristic impedance equal to the input line impedance of attenuator 34. T 33, constructed to provide a symmetrical joinder of three like transmission lines, provides equi-partition distribution of the transmitted portion of a signal received via one of said lines to the remaining two lines.

In operation, a voltage pulse initiated on line 30 by generator 29 travels to T 33 where it is partially reflected and partially transmitted due to the impedance discontinuity provided by the joinder of lines 31 and 32 to the signal transmission line 30. The attenuation factor at this point is 1.5 which may be readily ascertained by using Equation 4 and recalling that lines 30, 31 and 32 are of the same impedance.

The attenuated voltage pulse in transmission line 32 propagates thereon to detection means 36, whereupon slow wave structure 37 responds to the traveling wave signal and drives oscilloscope 38. As the impedance of wave structure 37 is matched to line 32, no reflection of the signal is created at this detection position and the signal pulse continues along line 32 to "get lost" end 35. Line 31, simultaneously with line 32, receives a like attenuated voltage pulse which travels to attenuator 34 and is reflectively attenuated in a manner described supra in conjunction with FIGURE 2. Each output line 39 received an attenuated replica of the original pulse signal emanating from generator 20. It is noted that the attenuation at this point is calculated from:

$$\text{output voltage} = \frac{\text{input voltage}}{\text{total attenuation factor}} \quad (7)$$

where the total attenuation factor is equal to 1.5 (contributed by T 33) times the attenuation factor of attenuator 34 (as determined by Equation 4 supra).

Further, the pulses on output lines 39 are sensed by detection means 41 without significantly disturbing the wave forms. For example, line 39a, shown with oscilloscope 42a, attached thereto by means of reflective free "tap off" leads 43a, receives a pulse from attenuator 34 which propagates along line 39a to "get lost" end 40a, exciting oscilloscope 42a as it passes by reflection-free "tap off" line 43a. This pulse measurement technique permits high display resolution of a high voltage fast rise pulse.

For example, using the values for input and output voltage disclosed in the discussion of FIGURE 2, i.e., 100 kv. input voltage and 4 kv. output voltage, a pulse analysis and measurement set up would be designed, for example, as follows:

Selecting 150 kv. as the peak voltage for signal generator 29, the 1.5 attenuation factor provided by T 33 reduces this peak voltage to 100 kv., appearing on lines 31 and 32, which is within the range of allowable input voltages for attenuator 34, as discussed in conjunction with FIGURE 2. In view of the fact that conventional oscilloscopes may have a maximum full scale deflection range of about 0 to 20 volts, oscilloscope 38, for example, will be able to display only a small portion of a high voltage wave form, although oscilloscope 38 may be biased to display any desired 20-volt portion of the signal. In the case shown, oscilloscope 38 will be left unbiased so as to record the "toe" of the waveform to high degree of resolution. The signal appearing across attenuator 34 will be attenuated to a peak voltage of about 4 kv. at output lines 39. Since the output of attenuator 34 provides a plurality of output lines 39, each carrying an attenuated replica of the original signal, detection means 41 may be individually biased at different or successively higher levels to display selected different segments of the pulse at high resolution.

Alternatively to the foregoing biasing scheme, high display resolution may be provided through the use of conventional Rossi extended range sweep signal devices. In such a design, each of oscilloscopes 42 would be provided with a Rossi sweep generator having a Rossi frequently differing from the others, and each of output lines 39 provided with resistive attenuators differing in value therebetween. The fast-rising or falling portions of an attenuated pulse would be accurately displayed by the oscilloscopes 42 having higher frequency Rossi signals, together with higher resistive attenuations in the output line associated therewith, while slower changing segments of the pulse could be analyzed by lower frequency Rossi sweeps, together with lower resistive attenuations.

Figure 4:
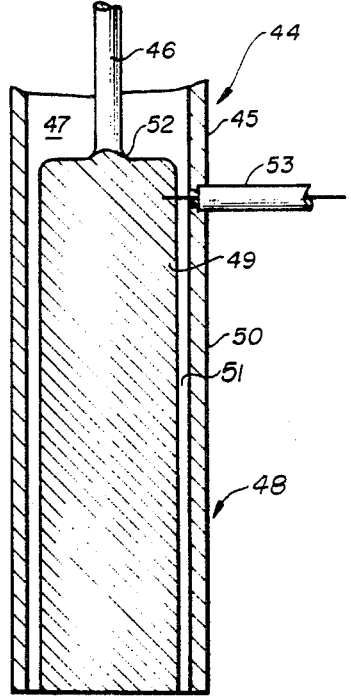
FIGURE 4 is a sectional, longitudinal front view of a coxial line impedance mismatch junction, incorporating a high impedance signal "pick-off" line.

FIGURE 4 depicts a coaxial line reflective attenuator in which an input coaxial transmission line 44 of relatively high impedance comprised of an outer conductor 45, an inner conductor 46 and a dielectric 47, is abruptly coupled to an output coaxial transmission line 48 of lower impedance. Line 48 is comprised of an inner conductor 49 of substantially larger diameter than input line inner conductor 46, an outer conductor 50 having a diameter approaching that of input line outer conductor 45, and a dielectric 51. Proximate to junction 52, a high impedance coaxial "pick-off" line 53 is arranged with an inner and outer conductor connected to inner and outer conductor 49 and 50 of output line 48.

As in the preceding embodiments, the reflecting attenuation in this design occurs at the impedance mismatch boundary between the input line 44 and the output line 48. However, unlike the device shown in FIGURE 1 or FIGURE 2, an extension for pulse measurements or pulse sensing means is provided by high impedance "pick-off" line 53 arranged proximate to junction 52 on output line 48 to intercept the transmitted attenuated pulse. Line 53 is selected to have a high impedance in relation to line 48 so as to avoid distortion of the reflective characteristics of junction 52. Appropriate display or output means are attached in reflection-free disposition along line 53, substantially as described for the arrangement shown in FIGURE 1 or FIGURE 3.

The low impedance output line 48 must be extended to a length that will prevent reflections occurring at an open end thereof from returning to the junction 52 at such a time as to interfere with the attenuation of the input pulse. This restriction requires that the transit time of output line 48 be greater than one-half the time duration of the input pulse or a selected portion thereof. As discussed supra, the length of the input line 44 is subject to the same requirements.

Figure 5:
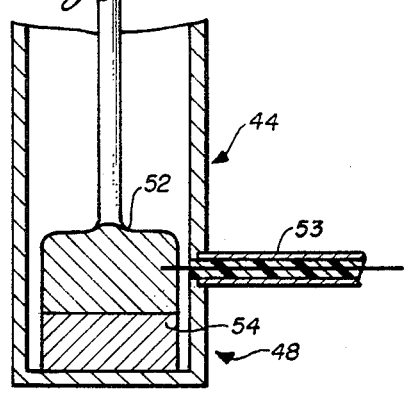
FIGURE 5 is a sectional, longitudinal view of the device shown in FIGURE 4, modified to include a fast response resistive match termination.

The device of FIGURE 4 may be modified in structure as shown in FIGURE 5. In this design, output line 48 is terminated in a resistive match near junction 52, with high impedance "pick-off" line 53 intersecting output line 48 between junction 52 and matched resistive termination 43. Since a matched resistance termination provides for absorption of all the wave energy incident to the boundary between the transmission line and the resistor, there is no wave reflection and consequently the restrictions of the length of output line 48 do not obtain here. This embodiment is suitable in applications where the output voltage is sufficiently low to permit fast response resistive termination, as discussed supra.

Accordingly, it will be apparent, while several preferred forms have been shown and described, changes may be made without departing from the spirit of the invention, as sought to be defined in the following claims.

What is claimed is:

1. In a method for attenuating a fast rise time voltage pulse, the steps comprising:
 (a) introducing said pulse at one end of a transmission line having a relatively high characteristic impedance to travel therealong as a traveling wave voltage pulse;
 (b) intercepting said traveling wave voltage pulse at the second end of said transmission line and applying such pulse to transmission line structure having a lower characteristic impedance than said line, providing an abrupt transition in impedance from the high characteristic impedance to the lower characteristic impedance so that a portion of said traveling wave voltage pulse is reflected back along said transmission line and a replica attenuated portion is passed therethrough;
 (c) passing said attenuated voltage pulse portion through a transmission line structure having a characteristic impedance equivalent to said lower characteristic impedance to a signal output portion thereof and
 (d) displaying, without reflective disturbance, said attenuated voltage pulse portion.

2. The method of claim 1, wherein said transmission line is of a length to provide a transit time equal to at least one-half the duration time of said pulse.

3. The method of claim 2, wherein said attenuated voltage pulse is displayed by attaching oscilloscope means through a reflective-free coupling to the output portion of said transmission line structure, and said attenuated pulse is displayed by said oscilloscope means.

4. The method of claim 1, further defined in that said pulse is smoothly, noiselessly, reflectively attenuated by coupling said transmission line into said transmission structure, wherein said structure comprises a plurality of output transmission lines joined at a common loocation to said transmission line, said output lines each extending a signal output portion thereof; whereby said output lines carry identical attenuated pulses.

5. The method of claim 4, further comprising the step of selectively detecting and measuring segmental portions of said attenuated pulse by attaching to the output portion of each of said output transmission lines through reflective-free coupling a voltage measurement means; said measurement means differentially responsive to successively higher adjacent voltage level segments of said attenuated pulse.

6. In an electrical signal attenuator for attenuating a high voltage, high equivalent frequency signal pulse, the combination comprising:
 (a) a first transmission line segment of a first characteristic impedance including input coupling means at one end for introduction of said high voltage signal pulse wherein said pulse travels therealong as a traveling wave to a second end thereof;
 (b) a transition impedance coupling means having an output connection means and an input coupled to the second end of said first transmission line segment to receive said traveling wave pulse; said coupling means providing an abrupt transition between said first characteristic impedance and said second characteristic impedance, so that a portion of said traveling wave pulse is reflected back along said first transmission line segment and an attenuated replica portion of said pulse is delivered at the output portion of said coupling;
 (c) a second transmission line means of an impedance equivalent to said second characteristic impedance connected to receive said attanuated pulse and transmit same to an output portion thereof; and
 (d) means operatively connected to said output portion of said second transmission line means for displaying, without reflective disturbance, 7. The device set forth in claim 6, further defined by said first transmission line segment being a coaxial cable, said transition impedance coupling being a coaxial transmission structure comprising an outer conductor shield, an inner conductor and a discoidal conductor having a larger diameter than said inner conductor; said discoidal conuctor coaxially disposed with said inner conductor proximate the output portion of coupling wherein the dimensions of said shield, together witht those of said inner conductor, provide a characteristic impedance therebetween, substantially equalling and said first characteristic impedance, and the conductor, provide a local characteristic impedance therebetween approximating said second characteristic impedance; the input of said coupling coaxially coupled to said second end of said first coaxial transmission line; said second transmission line means comprising a plurality of coaxial output transmission cables, the parallel composition impedance of which equals said second characteristic impedance, said cables arranged to radially intersect with said coaxial coupling structure, wherein the inner conductors of each of said output cables insulatingly penetrate said shield and electrically attach to said discoidal conductor; the outer conductors of each of said output cables terminatingly fasten to said shield.

8. The structure recited in claim 7, wherein said output cables are symmetrically, radially arranged about said coaxial coupling to porvide uniform impedance communication between the output of said coupling and said output cables.

9. The device recited in claim 8, further including a housing structure comprising an electrically conducting metallic cap coaxially electrically attached to the output end of said coupling, insulatingly distal from said discoidal conductor.

10. The apparatus recited in claim 9, further defined in that the joint between said coupling inner conductor and said discoidal conductor is filleted and the circumferential edges of said discoidal conductor are rounded, wherein said filleted and rounded edge are of radii no greater than one fifth of the radius of said discoidal conductor, thereby providing efficient attenuation of reflective waves caused by discontinuities existing on the surface of said discoidal conductor, together with effective abruptness in said impedance transition.

11. The apparatus set forth in claim 10, further including display means comprising a plurality of oscilloscope means one each electrically communicative with one each of said output cables at output portions thereof; said oscilloscope means differentially biased in relation with one another, at inputs thereof so that each oscilloscope is responsive to different voltage segments of said attenuated pulse.

12. The device recited in claim 6, wherein said first transmission line segment is a coaxial transmission cable; said coupling means comprises a first coaxial transmission line portion having a characteristic impedance equaling said first characteristic impedance; and a second coaxial transmission line portion having a characteristic impedance equaling said second characteristic impedance; said first and second portion of said coupling abruptly, coaxially abutting to provide said abrupt transition; said second transmission line means being a coaxial output transmission line; said output line coaxially coupled to the output portion of said coupling.

13. The apparatus defined in claim 11, including a pick-off line means comprising a coaxial cable of characteristic impedance at least twice that of said second characteristic impedance; said pick-off cable coupled to said coupling at said second portion thereof proximate said transition whereby said attenuated pulse is introduced into said pick-off line and travels therealong to an output end thereof.

14. The device recited in claim 12, wherein said coaxial output transmission line is terminated by a resistive impedance attached across the inner and outer conductor thereof.

References Cited

UNITED STATES PATENTS

| | | | |
|---|---|---|---|
| 3,108,466 | 10/1963 | Sander et al. | 73—35 |
| 3,184,955 | 5/1965 | Filler | 73—35 |
| 3,242,718 | 3/1966 | Berger et al. | 73—35 |
| 3,278,846 | 10/1966 | Patten et al. | |

OTHER REFERENCES

Carol G. Montgomery: "Technique of Microwave Measurements," McGraw-Hill Book Co., Inc., 1947, p. 803.

HERMAN KARL SAALBACH, Primary Examiner

T. J. VEZEAU, Assistant Examiner

U.S. Cl. X.R.

73—35; 324—95, 121; 333—81